(12) United States Patent
Wakumoto et al.

(10) Patent No.: US 8,533,817 B2
(45) Date of Patent: *Sep. 10, 2013

(54) METHOD AND APPARATUS FOR CONNECTION-RATE FILTERING

(75) Inventors: Shaun K. Wakumoto, Roseville, CA (US); Frank A. Reichstein, Rocklin, CA (US); Ballard C. Bare, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2636 days.

This patent is subject to a terminal disclaimer.

(21) Appl. No.: 11/244,505

(22) Filed: Oct. 5, 2005

(65) Prior Publication Data

US 2007/0086334 A1    Apr. 19, 2007

(51) Int. Cl.
*H04L 29/06* (2006.01)

(52) U.S. Cl.
USPC ............. 726/22; 726/26; 713/151; 709/224; 709/225

(58) Field of Classification Search
USPC ............. 726/3, 11, 13, 26, 24, 224, 23, 14, 726/22; 713/151–155, 163; 709/220–222, 709/227–229; 715/734–736; 370/254–258; 705/25, 109; 725/110, 109
See application file for complete search history.

(56) References Cited

U.S. PATENT DOCUMENTS

| 7,457,965 B2 * | 11/2008 | Tamura et al. ................ 713/182 |
| 2003/0145232 A1 * | 7/2003 | Poletto et al. ................ 713/201 |

OTHER PUBLICATIONS

Matthew M. Williamson, "Throttling Viruses: Restricting Progapation to Defeat Malicious Mobile Code", Jun. 17, 2002, pp. 1-6.
Matthew M. Williamson, "Virus Throttling", Virus Bulletin Ltd., Mar. 2003, pp. 8-11.
Joris De Schutter, et al., "Kalman Filters: A Tutorial", Journal A, vol. 40 (4), Dec. 1999, pp. 52-59.
"Connection-Rate Filtering Based on Virus-Throttling Technology", ProCurve Networking HP Innovation, Jun. 2005.

* cited by examiner

*Primary Examiner* — Mohammad L Rahman

(57) ABSTRACT

One embodiment disclosed relates to a method of connection-rate filtering. A rate of traffic through a port of a network device is measured. The measured traffic rate is compared with a pre-set threshold rate. Packets are sampled from the port over a period of time if the pre-set threshold rate is exceeded by the measured traffic rate, and the sampled packets are analyzed. Other embodiments are also disclosed.

20 Claims, 4 Drawing Sheets

METHOD AND APPARATUS FOR CONNECTION-RATE FILTERING

BACKGROUND OF THE INVENTION

1. Field of the Invention

The present invention relates generally to computer networking and computer software.

2. Description of the Background Art

Virus throttling or connection-rate filtering is a technique for containing the damage caused by fast-spreading worms and viruses. Rather than attempting to prevent a computing machine from becoming infected, virus throttling inhibits the spreading of the worm or virus from an infected machine. This reduces damage because the worm or virus is able to spread less quickly, and this also reduces the network traffic caused by such worms and viruses.

Virus throttling is based on controlling an infected machine's network behavior, and so does not rely on details of the specific virus. In other words, a virus signature is not needed to implement connection rate filtering. Although virus throttling does not prevent infection in the first place, it helps to contain damage by restricting the spread of the virus. With such throttling, a virus or worm outbreak will grow less rapidly, and the network load will be reduced. Further, by damping down the spread of the virus or worm, the throttling buys time for signature-based solutions to reach machines before the virus or worm.

Virus throttling technology has been implemented in the ProCurve® Switch 5300xl available from the Hewlett Packard Company. In the ProCurve® Switch 5300xl, virus throttling works by intercepting Internet Protocol (IP)-routed connection requests in which the source subnet and the destination subnet are different. When a given host exceeds a certain number of unique routed connections within a specific amount of time, the switch may consider this host to be infected by malicious code (such as a virus or worm) and may take appropriate actions.

It is highly desirable to control the spread of computer viruses and other malicious code. More particularly, it is highly desirable to improve methods and apparatus for virus throttling or connection-rate filtering.

SUMMARY

One embodiment disclosed relates to a method of connection-rate filtering. A rate of traffic through a port of a network device is measured. The measured traffic rate is compared with a pre-set threshold rate. Packets are sampled from the port over a period of time if the pre-set threshold rate is exceeded by the measured traffic rate, and the sampled packets are analyzed.

Another embodiment disclosed relates to a network device configured with connection-rate filtering. The device includes a plurality of ports, metering circuitry configured to measure a traffic rate on a port, and sampling circuitry configured to sample packets from the port if the traffic rate exceeds a pre-determined threshold rate. A switch agent is configured to receive the sampled packets and to determine a number of distinct destinations for each source in the sampled packets.

Other embodiments are also disclosed.

DETAILED DESCRIPTION

Figure 1:
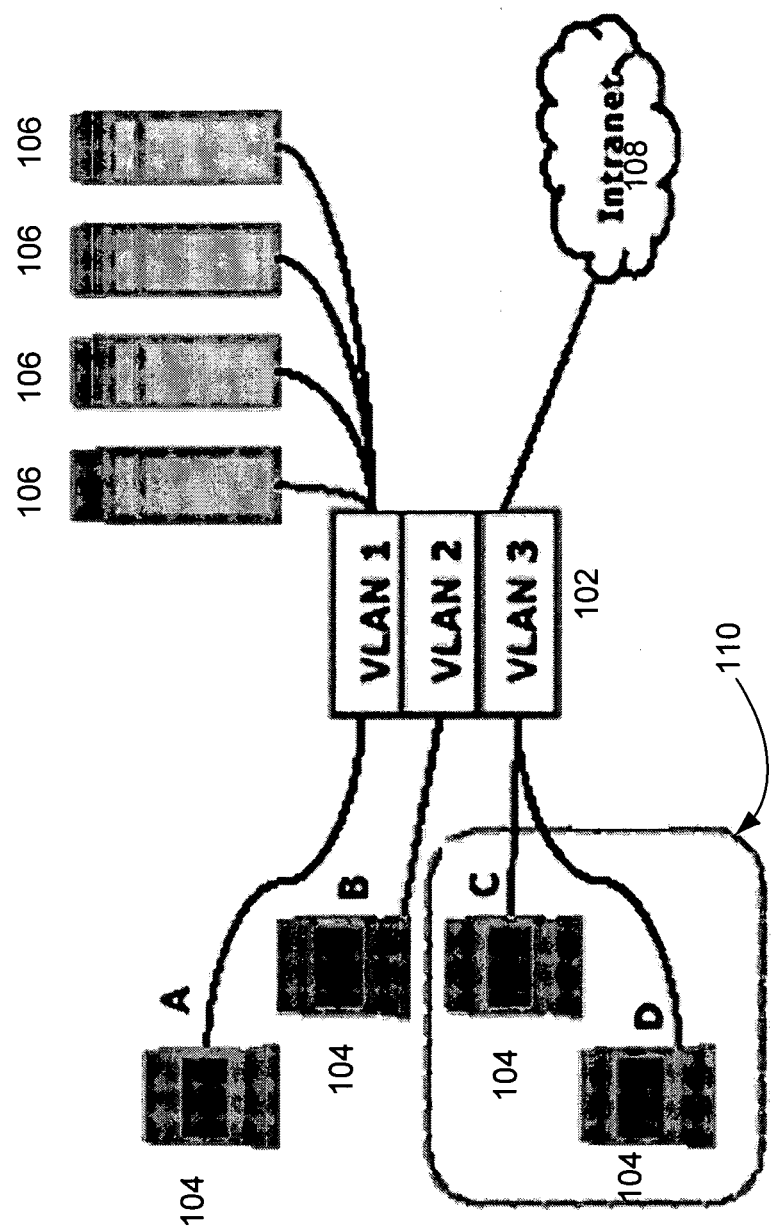
FIG. 1 is a schematic diagram depicting an example system using conventional virus throttling technology.

FIG. 1 is a schematic diagram depicting an example system 100 using conventional virus throttling technology. The system 100 includes a network switch apparatus 102. The switch apparatus 102 may comprise, for example, a ProCurve® Switch 5300xl available from the Hewlett Packard Company. Connected to various ports of the switch apparatus 102 are, for example, host devices 104 and networked servers 106. The switch apparatus 102 may also be connected via a port to an Intranet 108. Other networks and network devices may also be connected to the switch apparatus 102.

The switch apparatus 102 is configured with Internet Protocol routing capabilities. The switch apparatus 102 is also configured to handle multiple virtual local area networks (VLANs). In the illustration, three VLANs are shown. In the example network, the ports configured to be on VLAN1 connect to host A and to the networked servers. A port configured to be on VLAN2 connects to host B. Finally, ports configured to be members of VLAN3 connect to hosts C and D and to the Intranet.

The switch apparatus 102 performs virus throttling (connection-rate filtering) by intercepting IP-routed connection requests, that is, connections crossing VLAN boundaries, in which the source subnet and destination subnet are different. Such IP-routed connection requests include, for example, TCP connections, UDP packets, SMTP requests, HTTP requests, and connection requests of most other common session and application protocols.

For example, if the devices on VLAN3 are infected with malicious code, such as a virus or worm, then the virus throttling feature of the switch apparatus 102 may protect the devices on VLAN1 and VLAN2 from high connection rate traffic that is being routed from the infected VLAN3. Such high connection rate traffic is characteristic of attacks from viruses and other malicious code.

The above-discussed configuration requires that all new source/destination traffic streams be programmed into a route table. The route table provides a "working set" of recent connections from each source and may be used to determine the number of unique connections that a given source has been trying to make in a recent time period. Hence, the above-discussed configuration may provide connection-rate filtering, but it generally requires that the switch have networking layer 3 routing enabled.

Figure 2:
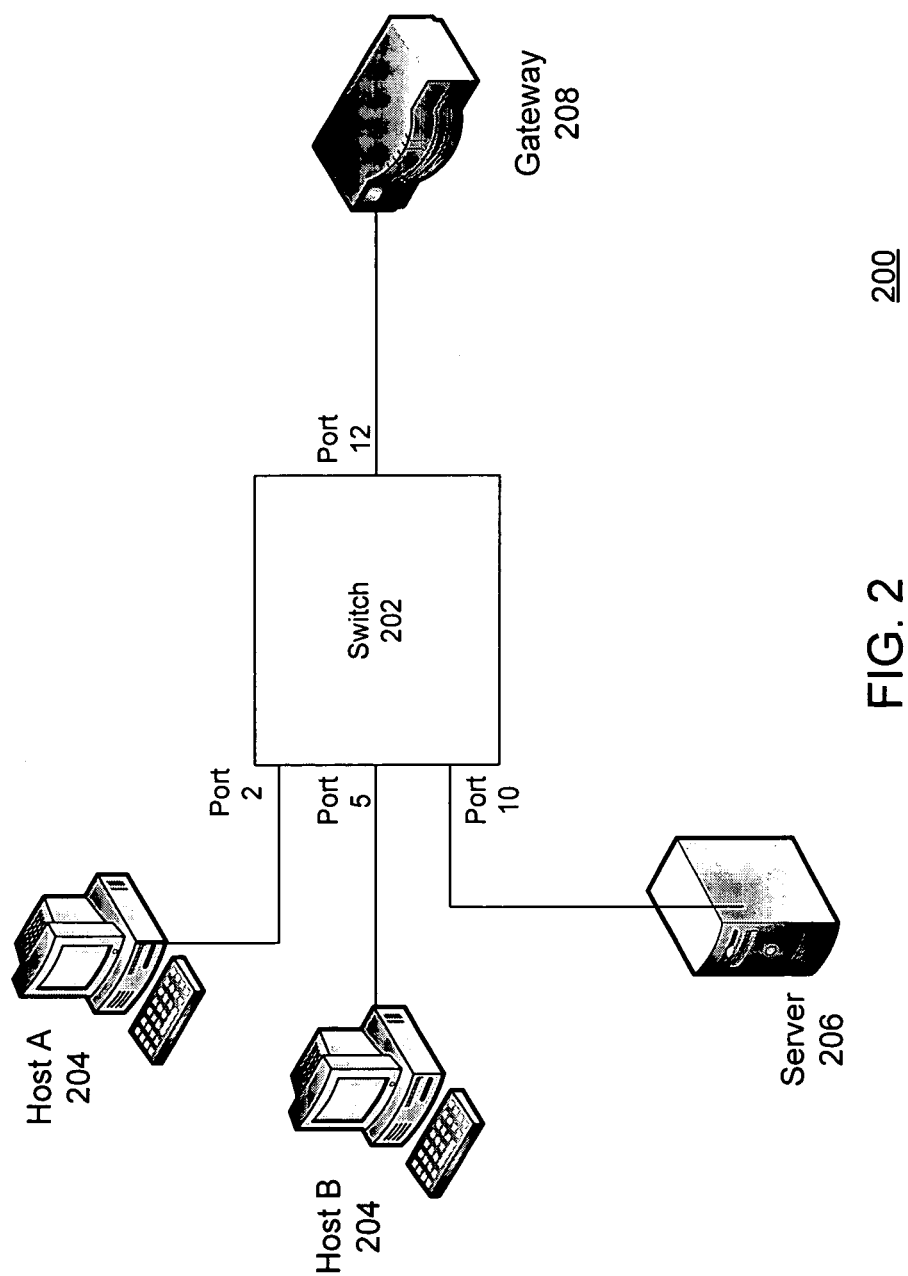
FIG. 2 is a schematic diagram depicting an example system in which connection-rate filtering may be implemented in accordance with an embodiment of the invention.

FIG. 2 is a schematic diagram depicting an example system in which connection-rate filtering may be implemented in accordance with an embodiment of the invention. In this example, the switching apparatus 202 is depicted as being connected via port 2 to Host A 204, via port 5 to Host B 204, via port 10 to Server 206, and via port 12 to Gateway 208.

Here, the switching apparatus 202 does not necessarily need to have layer 3 routing nor virtual local area networking enabled in order to provide connection-rate filtering. As discussed further below, the switching apparatus 202 may be configured so as to provide connection-based filtering in a way that does not depend upon new traffic streams being programmed into a route table. In particular, metering and sampling may be utilized to avoid the need to maintain a route table.

Figure 3:
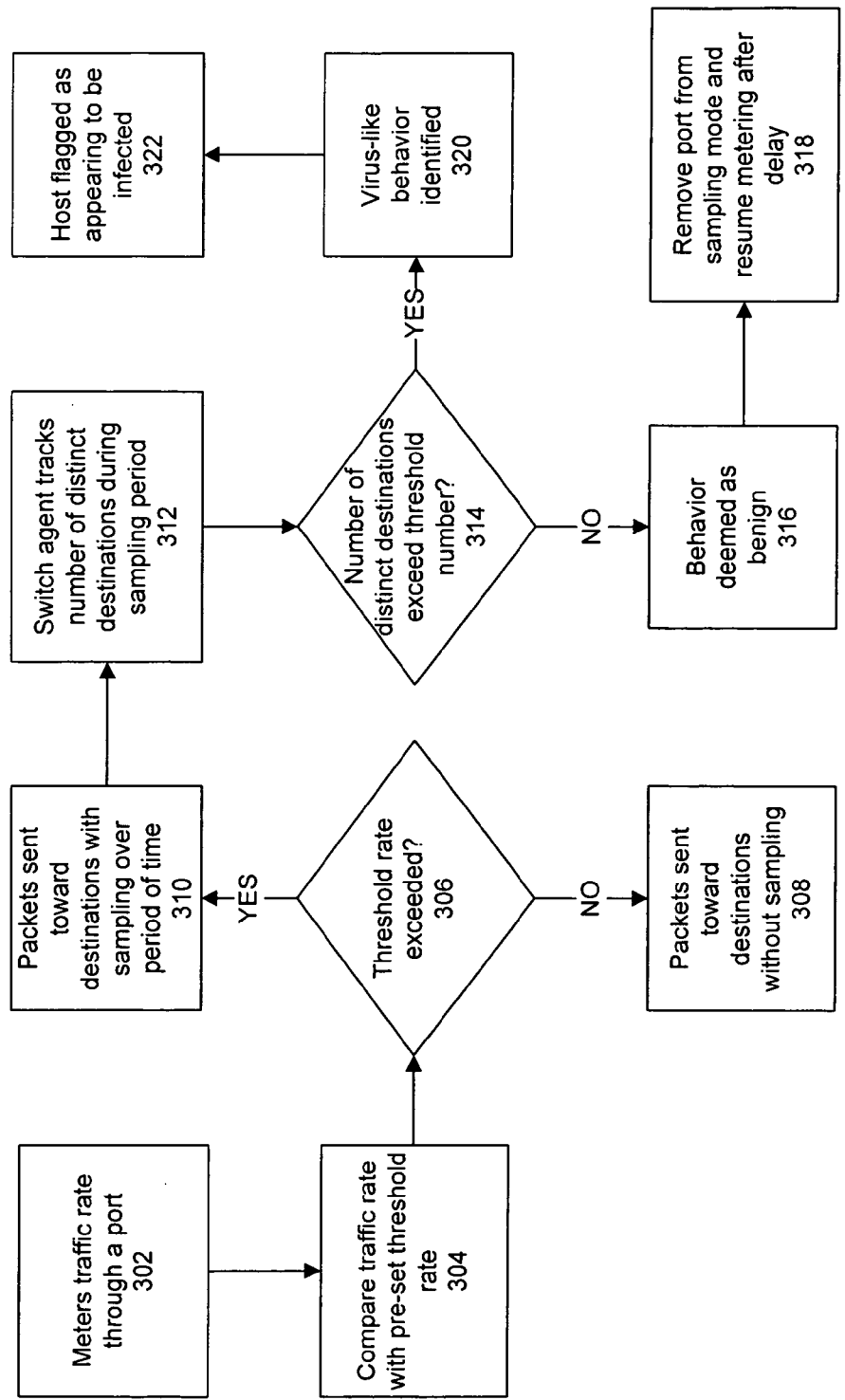
FIG. 3 is a flow chart depicting a method for connection-rate filtering using metering and sampling in accordance with an embodiment of the invention.
Figure 4:
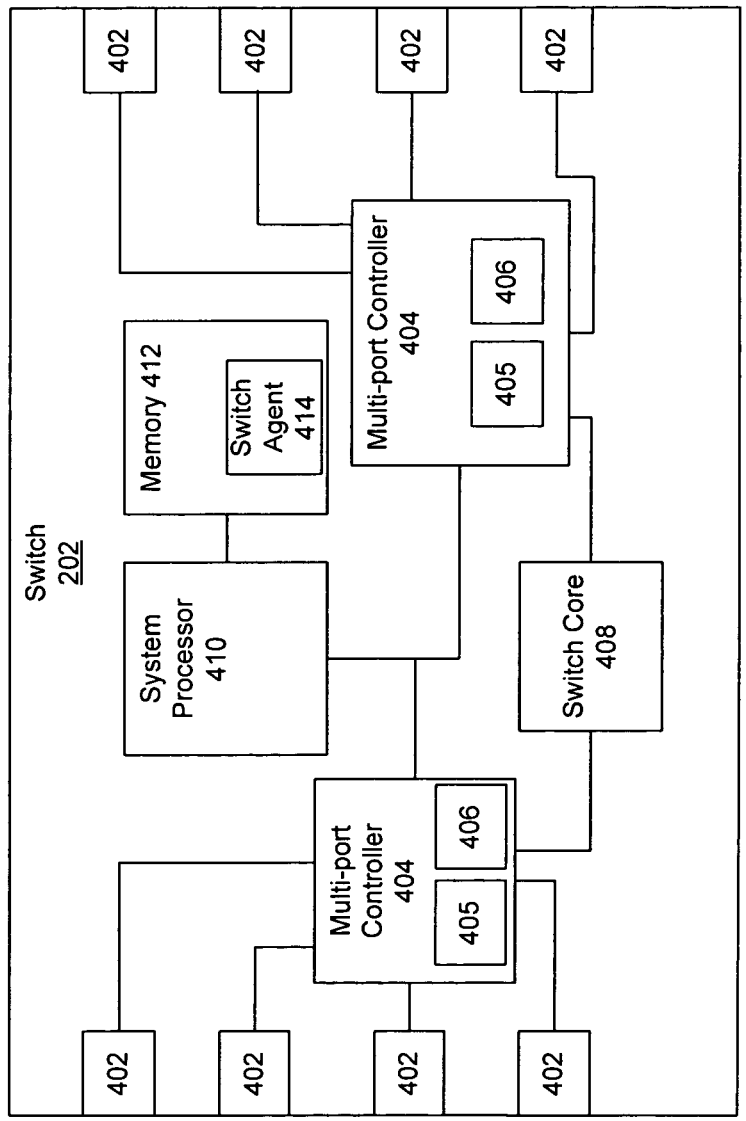
FIG. 4 is a schematic diagram of a switching apparatus configured with port-based connection-rate filtering using metering and sampling in accordance with an embodiment of the invention.

FIG. 3 is a flow chart depicting a method 300 for connection-rate filtering using metering and sampling in accordance with an embodiment of the invention. FIG. 4 is a schematic diagram of a switching apparatus 202 configured with connection-rate filtering using metering and sampling in accordance with an embodiment of the invention. By using metering and sampling, maintaining a working set of recent source/destination connection requests becomes unnecessary and may be avoided.

A switching apparatus (such as switch 202) meters 302 a traffic through a port 402. The traffic being metered may be ingress traffic, or egress traffic, or a total traffic (including both ingress and egress traffic). Metering ingress traffic may be applied to monitor packets received on a port of the apparatus. Metering egress traffic may be applied to monitor packets sent out of a port of the apparatus.

For example, the switch 202 configured in FIG. 2 may measure the ingress rate of packets incoming on port number 2 which is connected to Host A 204. The metering 302 may be performed, for example, by metering circuitry 405 within a multi-port controller 404 connected to the port 402 being metered.

In one embodiment, all ingress traffic coming in on a port may be measured. In another embodiment, only certain types of traffic coming into a port may be measured. For instance, only ingress traffic on port number 2 that is destined to the MAC address of the gateway router 208 may be measured.

The measured traffic rate may then be compared 304 against a pre-set threshold rate. The threshold rate may be configurable by a network administrator or other user. The comparison may be performed, for example, by circuitry and/or code within the controller 404. If it is determined 306 that the threshold rate is not exceeded, then the packets may be sent 308 towards their destinations without sampling (as would normally be done without connection-rate metering). The packets may be sent 308 to their destinations, for example, by way of a conventional switch core 408 which interconnects the ports.

Otherwise, if it is determined 306 that the threshold rate is exceeded, then the packets may be sent 310 towards their destinations, but with sampling over a period of time. For example, the sampling period (i.e. the period during which the port is set in sampling mode) may be in a range of ten to fifteen seconds. The sampling 310 may be performed, for example, by sampling circuitry 406 within the controller 404. The sampling 310 may be performed, for example, by forwarding every nth (for example, every tenth) packet up to a switch agent 414. The switch agent 414 may be implemented, for example, as code in memory 412 which is being executed by the system processor 410 of the switch 402.

The switch agent 414 may be configured to track or count 312 the number of distinct destinations for the sampled host communications received during the sampling period. Although only a portion of the traffic of interest is sampled, the sampled traffic may be taken as representative of the traffic of interest.

If it is determined 314 that the number of distinct destinations in the sampled traffic from each source host does not exceed the threshold number, then the "behavior" of the source hosts may be deemed 316 as benign (not suspected as being malicious). Thereafter, the port may be removed 318 from sampling mode and metering may be resumed after a pre-set delay. The pre-set delay may be, for example, for a few minutes. The pre-set delay advantageously allows the benign behavior to play itself out such that unnecessary repeated sampling may be avoided.

On the other hand, if it is determined 314 that the number of distinct destinations in the sampled traffic from a source host does exceed the threshold number, then the "behavior" of the source host may be identified 320 as exhibiting virus-like (suspicious) behavior. Hence, that suspiciously behaving host (i.e. the source address) may be flagged 322 by the switch agent 414 as appearing to be infected by malicious code.

In addition to the above-described steps, further methodology may be applied. For example, a notification may be sent indicating that a specific source is exhibiting potentially malicious behavior, and/or traffic from the specific source may be blocked by the connection-rate filtering apparatus.

In one implementation, the blocking of traffic may be for a temporary period of time to slow down spreading of malicious code. After such a temporary blocking period, packets from the port may be re-sampled and re-analyzed. In another implementation, the blocking of traffic may continue until a command is received from a user to unblock traffic from the specific source.

In one embodiment, to specifically protect against TCP-based viruses attacking a network, the meter applied in hardware may be used to filter traffic which is destined for the gateway MAC address and which also has the TCP SYN flag set. The SYN flag is typically only set when initiating TCP connections.

Advantageously, the above-described connection-rate filtering solution does not require routing to be enabled on the switching apparatus. The above-described solution may be performed in switching apparatus that has metering and sampling capabilities.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of connection-rate filtering, the method comprising:

measuring a rate of traffic through a port of a network device;

comparing the measured traffic rate with a pre-set threshold rate;

sampling packets from the port over a period of time if the pre-set threshold rate is exceeded by the measured traffic rate; and analyzing the sampled packets;

in which said analyzing comprises determining a number of distinct destinations for each source in the sampled packets.

2. The method of claim 1, in which said sampling comprises forwarding a fraction of packets through said port to a sampling agent configured for counting a number of distinct destinations for each source in the sampled packets.

3. The method of claim 1, further comprising determining if a threshold number of distinct destinations is exceeded by the number of distinct destinations for each source.

4. The method of claim 3, further comprising identifying potentially malicious behavior by a specific source if the threshold number is exceeded for the specific source.

5. The method of claim 3, further comprising sending a notification indicating that a specific source is exhibiting potentially malicious behavior if the threshold number is exceeded for the specific source.

6. The method of claim 3, further comprising blocking traffic from a specific source if the threshold number is exceeded for the specific source.

7. The method of claim 6, wherein the blocking is for a temporary period of time, and further comprising re-sampling packets from the port and re-analyzing the sampled packets after the temporary period expires.

8. The method of claim 6, wherein the blocking continues until a command is received from a user to unblock traffic from the specific source.

9. The method of claim 1, further comprising providing a delay before resuming the connection-rate filtering if the threshold number of distinct destinations is not exceeded for any source in the sampled packets.

10. The method of claim 1, wherein the rate of traffic comprises an ingress traffic rate.

11. The method of claim 1, wherein the rate of traffic comprises an egress traffic rate.

12. A network device configured with connection-rate filtering, the device comprising:
a plurality of ports;
metering circuitry configured to measure a traffic rate on a port;
sampling circuitry configured to sample packets from the port if the traffic rate exceeds a pre-determined threshold rate; and
a switch agent configured to receive the sampled packets and to determine a number of distinct destinations for each source in the sampled packets.

13. The device of claim 12, wherein the switch agent is further configured to determine if a threshold number of distinct destinations is exceeded by the number of distinct destinations for each source.

14. The device of claim 13, wherein the switch agent is further configured to send a notification indicating that a specific source is exhibiting potentially malicious behavior if the threshold number is exceeded for the specific source.

15. The device of claim 13, wherein the switch agent is further configured to block traffic from a specific source if the threshold number is exceeded for the specific source.

16. The device of claim 12, wherein the device is configured to provide a delay before resuming the connection-rate filtering if the threshold number of distinct destinations is not exceeded for any source in the sampled packets.

17. The device of claim 12, wherein the rate of traffic comprises an ingress traffic rate.

18. The device of claim 12, wherein the rate of traffic comprises an egress traffic rate.

19. An apparatus for connection-rate filtering, the apparatus comprising:
means for metering a rate of traffic through a port of the apparatus;
means for determining if a pre-set threshold rate is exceeded by the rate of traffic through the port;
means for forwarding copies of packets from the port over a period of time if the pre-set threshold rate is exceeded by the measured traffic rate; and
means for analyzing the forwarded copies to determine a number of distinct destinations per source therein.

20. The apparatus of claim 19, further comprising:
means for determining if a threshold number of distinct destinations is exceeded by the number of distinct destinations per source.

* * * * *